D. B. LUTEN.
WEDGE.
APPLICATION FILED JULY 26, 1911.
1,141,250. Patented June 1, 1915.
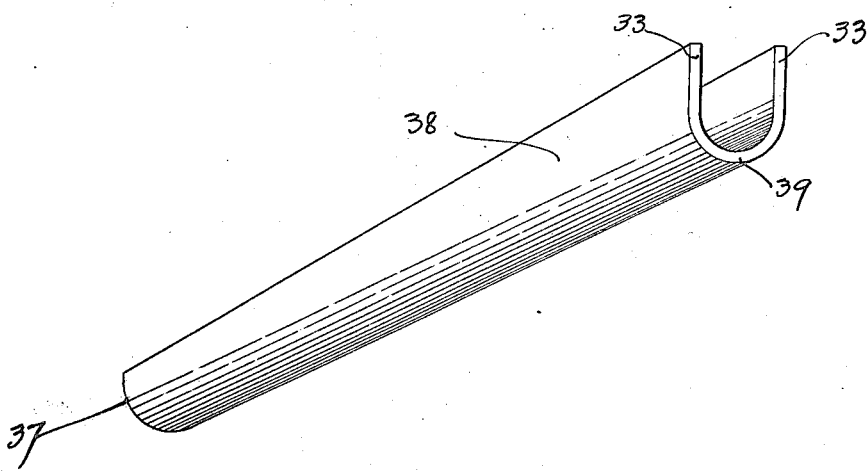
WITNESSES:
INVENTOR.
BY
ATTORNEY.

UNITED STATES PATENT OFFICE.

DANIEL B. LUTEN, OF INDIANAPOLIS, INDIANA.

WEDGE.

1,141,250.  Specification of Letters Patent.  Patented June 1, 1915.

Original application filed September 25, 1906, Serial No. 336,157. Divided and this application filed July 26, 1911. Serial No. 640,710.

*To all whom it may concern:*

Be it known that I, DANIEL B. LUTEN, a citizen of the United States, residing at Indianapolis, in the county of Marion and State of Indiana, have invented a new and useful Improvement in Wedges, of which the following is a specification.

My invention relates to improvements in wedges and has for its purpose to provide a light, easily manufactured wedge of rounded form to serve as a tightening retainer in a grooved seat.

The present application is a division of an application filed by me September 25, 1906, Serial No. 336,157.

The invention is illustrated in the accompanying perspective drawing.

The wedge 38 is of U form in section, the rounded part 39 of the U maintaining a constant section throughout its length so that it may be moved lengthwise readily in a corresponding seat, but with the legs 33 of the U decreasing in length toward the end 37 to give the wedge the desired taper. Such a wedge may be conveniently formed by bending a tapered sheet into a longitudinally-grooved form. The advantage of such a wedge over the old forms is that for a rounded seat the wedge is forced by the pressure of its driving into the seat, taking that form and thus bedding very securely against the seat. The compression induced by the driving into place tends to hold the sheet securely to its form with no danger of buckling because the pressure is always outward along the curve. And the saving in material is very great at the same time that a strong wedge is provided for a curved seat. A similar wedge of rectangular cross-section would have no appreciable strength, but the curved surface opposite the two legs makes the sheet metal wedge an exceedingly strong wedge at small cost.

I claim:—

1. A wedge having two longitudinally-converging edges, one of said edges being of curved cross section substantially constant in form and size throughout the length of that edge, and the other edge comprising a plurality of separated substantially parallel members.

2. A wedge formed of a piece of sheet metal having two converging edges and doubled so that said two edges of the sheet metal piece lie substantially in the same plane with each other and converge with the plane tangent to the piece at the medial line thereof.

3. A wedge formed of a piece of sheet metal doubled so that the middle of the piece has a substantially semi-annular cross-section and the two edges of the piece lie substantially in the same plane with each other and converge with the plane tangent to the piece of the medial line thereof.

4. A wedge having a substantially U-shaped cross section of substantially uniform thickness with the base of the U of substantially uniform curvature throughout the length of the wedge and the legs of the U of gradually diminishing length toward one end of the wedge.

5. A wedge having a substantially U-shaped cross section of substantially uniform thickness with the legs of the U of gradually diminishing length toward one end of the wedge and the thickness of the U substantially uniform throughout.

6. A wedge formed of a piece of sheet metal having two converging edges and folded so that the middle part of the piece between said two edges has substantially the form of a section of a cylinder and the parts at and near such edges lie in planes tangent to said cylinder.

In witness whereof, I have hereunto set my hand and seal at Indianapolis, Indiana, this 20th day of July, A. D. one thousand nine hundred and eleven.

DANIEL B. LUTEN.  [L. S.]

Witnesses:
MAY LAYDEN,
FRANK A. FAHLE.

Copies of this patent may be obtained for five cents each, by addressing the "Commissioner of Patents, Washington, D. C."